United States Patent
Okino (10) Patent No.: US 12,143,446 B2
(45) Date of Patent: Nov. 12, 2024

(54) SYSTEM AND METHOD FOR NETWORK BANDWIDTH MANAGEMENT IN VEHICLE

(71) Applicant: WOVEN BY TOYOTA, INC., Tokyo (JP)

(72) Inventor: Naoto Okino, Tokyo (JP)

(73) Assignee: WOVEN BY TOYOTA, INC., Tokyo (JP)

( * ) Notice: Subject to any disclaimer, the term of this patent is extended or adjusted under 35 U.S.C. 154(b) by 0 days.

(21) Appl. No.: 18/091,787

(22) Filed: Dec. 30, 2022

(65) Prior Publication Data
US 2024/0223657 A1  Jul. 4, 2024

(51) Int. Cl.
H04L 12/70 (2013.01)
H04L 47/70 (2022.01)
H04L 67/12 (2022.01)

(52) U.S. Cl.
CPC ............ H04L 67/12 (2013.01); H04L 47/821 (2013.01)

(58) Field of Classification Search
CPC .............................. H04L 67/12; H04L 47/821
USPC ....................................................... 709/240
See application file for complete search history.

(56) References Cited

U.S. PATENT DOCUMENTS

| | | | |
|---|---|---|---|
| 7,529,247 B2 | 5/2009 | Rogers | |
| 7,808,913 B2 | 10/2010 | Ansari et al. | |
| 2007/0081473 A1* | 4/2007 | Jiang | H04L 12/403 370/254 |
| 2009/0304021 A1 | 12/2009 | Kraemer et al. | |
| 2010/0152947 A1* | 6/2010 | Denholm | G07C 5/0808 701/29.6 |
| 2011/0022809 A1* | 1/2011 | Satoh | G06F 9/45533 711/155 |
| 2016/0352533 A1* | 12/2016 | Talty | H04L 12/4015 |
| 2018/0217953 A1* | 8/2018 | Cross | G06F 13/364 |
| 2019/0140860 A1* | 5/2019 | Sonnenmoser | B66B 1/3461 |
| 2021/0389939 A1* | 12/2021 | Kono | H04L 67/125 |
| 2022/0351555 A1* | 11/2022 | Sakurai | G07C 5/0841 |
| 2023/0129603 A1* | 4/2023 | Ujiie | H04L 9/08 |

FOREIGN PATENT DOCUMENTS

| | | | |
|---|---|---|---|
| CN | 111240829 B | * 12/2023 | ........... G06F 9/5038 |
| JP | 2007-81628 A | 3/2007 | |
| JP | 2014-72673 A | 4/2014 | |
| JP | 2021093017 A | * 6/2021 | |

* cited by examiner

*Primary Examiner* — Moustafa M Meky
*Assistant Examiner* — Elizabeth Kassa
(74) *Attorney, Agent, or Firm* — Sughrue Mion, PLLC (57) ABSTRACT

A method and system for scheduling data transfer requests for a plurality of electronic control units (ECUs) connected to a network in a vehicle. The system includes: at least one memory storing first instructions and second instructions; a first ECU; and a plurality of second ECUs, wherein the first ECU is configured to execute the first instructions to configure a plurality of phases that are time slices for transferring data over the network, and wherein each of the plurality of second ECUs is configured to execute the second instructions to: maintain a data transfer request queue divided into a plurality of priority levels respectively corresponding to the plurality of phases; and transfer a data transfer request in the queue during a phase corresponding to a priority level for the data transfer request.

18 Claims, 6 Drawing Sheets

Request queue of
each ECU

SYSTEM AND METHOD FOR NETWORK BANDWIDTH MANAGEMENT IN VEHICLE

TECHNICAL FIELD

Systems and methods consistent with example embodiments of the present disclosure relate to bandwidth management of in-vehicle communication networks.

BACKGROUND

The need for bandwidth and low latency data transfer for in-vehicle communications is constantly increasing as advanced driver assistance systems (ADAS) and automated driving (i.e., assisted driving) (AD) became standard applications. In line with this trend, the number of electronic control units (ECUs) connected to an in-vehicle communication network using Ethernet and the attendant data traffic thereof also continues to increase. For example, a modern vehicle may include up to 150 ECUs, wherein some of the ECUs may run on different operation systems without sharing a central operation system that manages the bandwidth occupied by each ECU. As a result, due to the amount of network data traffic, varying qualities of the vehicle's communication network connection, and the lack of efficient bandwidth management of the in-vehicle communication network, the transfer of data from each ECU is not always guaranteed.

SUMMARY

According to embodiments, systems and methods are provided for scheduling and synchronizing data transfer (input/output (I/O)) requests by each ECU in accordance with respective priorities of the requests independent of the ECU operation system. To this end, the systems and methods effectively manage the local network traffic (i.e., network bandwidth) of a vehicle to ensure that highest priority requests are transferred in a timely manner by allocating different priorities to different data transfer I/O requests in each ECU and scheduling the data transfer I/O requests over the network based on the allocated priorities.

According to embodiments, a system for scheduling data transfer requests for a plurality of electronic control units (ECUs) connected to a network in a vehicle, includes: at least one memory storing first instructions and second instructions; a first ECU; and a plurality of second ECUs, wherein the first ECU is configured to execute the first instructions to configure a plurality of phases that are time slices for transferring data over the network, and wherein each of the plurality of second ECUs is configured to execute the second instructions to: maintain a data transfer request queue divided into a plurality of priority levels respectively corresponding to the plurality of phases; and transfer a data transfer request in the queue during a phase corresponding to a priority level for the data transfer request.

Each of the plurality of phases may have a same size.

At least two of the plurality of phases may have different sizes.

A size of a phase corresponding to a higher priority level may be greater than a size of a phase corresponding to a lower priority level.

The first ECU may be further configured to execute the first instructions to: change a prior configuration of the plurality of phases.

The first ECU may be further configured to execute the first instructions to: change the prior configuration to a new configuration based on at least one of network performance data and a current network environment.

The first ECU may be further configured to execute the instructions to: allocate a predetermined maximum percentage to each phase for prioritizing urgent requests.

Each of the plurality of second ECUs may be further configured to execute the instructions to: indicate, to the first ECU, that a request queue for a priority level corresponding to a current phase is empty; and control to transition, by the first ECU, to a next phase ahead of a scheduling time for the next phase, based on all of the plurality of second ECUs indicating that their respective request queue is empty for the priority level corresponding to the current phase.

According to embodiments, a method for scheduling data transfer requests for a plurality of electronic control units (ECUs) connected to a network in a vehicle, includes: configuring, by at least one ECU of the plurality of ECUs, a plurality of phases that are time slices for transferring data over the network; maintaining, by each of the plurality of ECUs, a data transfer request queue divided into a plurality of priority levels respectively corresponding to the plurality of phases; and transferring, by each of the plurality of ECUs, a data transfer request in the queue during a phase corresponding to a priority level for the data transfer request.

Each of the plurality of phases may have a same size.

At least two of the plurality of phases may have different sizes.

A size of a phase corresponding to a higher priority level may be greater than a size of a phase corresponding to a lower priority level.

The configuring may include changing, by the at last one ECU, a prior configuration of the plurality of phases.

The changing the prior configuration may include changing the prior configuration to a new configuration based on at least one of network performance data and a current network environment.

The configuring may include allocating a predetermined maximum percentage to each phase for prioritizing urgent requests.

The method may further include: indicating, by an ECU to the at least one ECU, that a request queue, of the ECU, for a priority level corresponding to a current phase is empty; controlling to transition, by the at least one ECU, to a next phase ahead of a scheduling time for the next phase, based on all of the plurality of ECUs indicating that their respective request queue is empty for the priority level corresponding to the current phase.

According to embodiments, at least one non-transitory computer-readable recording medium has recorded thereon instructions executable by a plurality of electronic control units (ECUs) connected to a network in a vehicle, to perform a method for scheduling data transfer requests for the plurality of ECUs, the method including: configuring, by at least one ECU of the plurality of ECUs, a plurality of phases that are time slices for transferring data over the network; maintaining, by each of the plurality of ECUs, a data transfer request queue divided into a plurality of priority levels respectively corresponding to the plurality of phases; and transferring, by each of the plurality of ECUs, a data transfer request in the queue during a phase corresponding to a priority level for the data transfer request.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which allocating different priorities to different data transfer I/O requests in request queues of each ECU and scheduling the data transfer I/O requests over the network based on the allocated priorities ensures that highest priority requests are transferred in a timely manner. Moreover, the allocating and scheduling as set forth above ensures that lower priority data transfer I/O requests are considered, respectively. As a result, the transfer of data from each ECU can be guaranteed and bandwidth management can be optimized to lower the latency of high priority requests.

Figure 1:
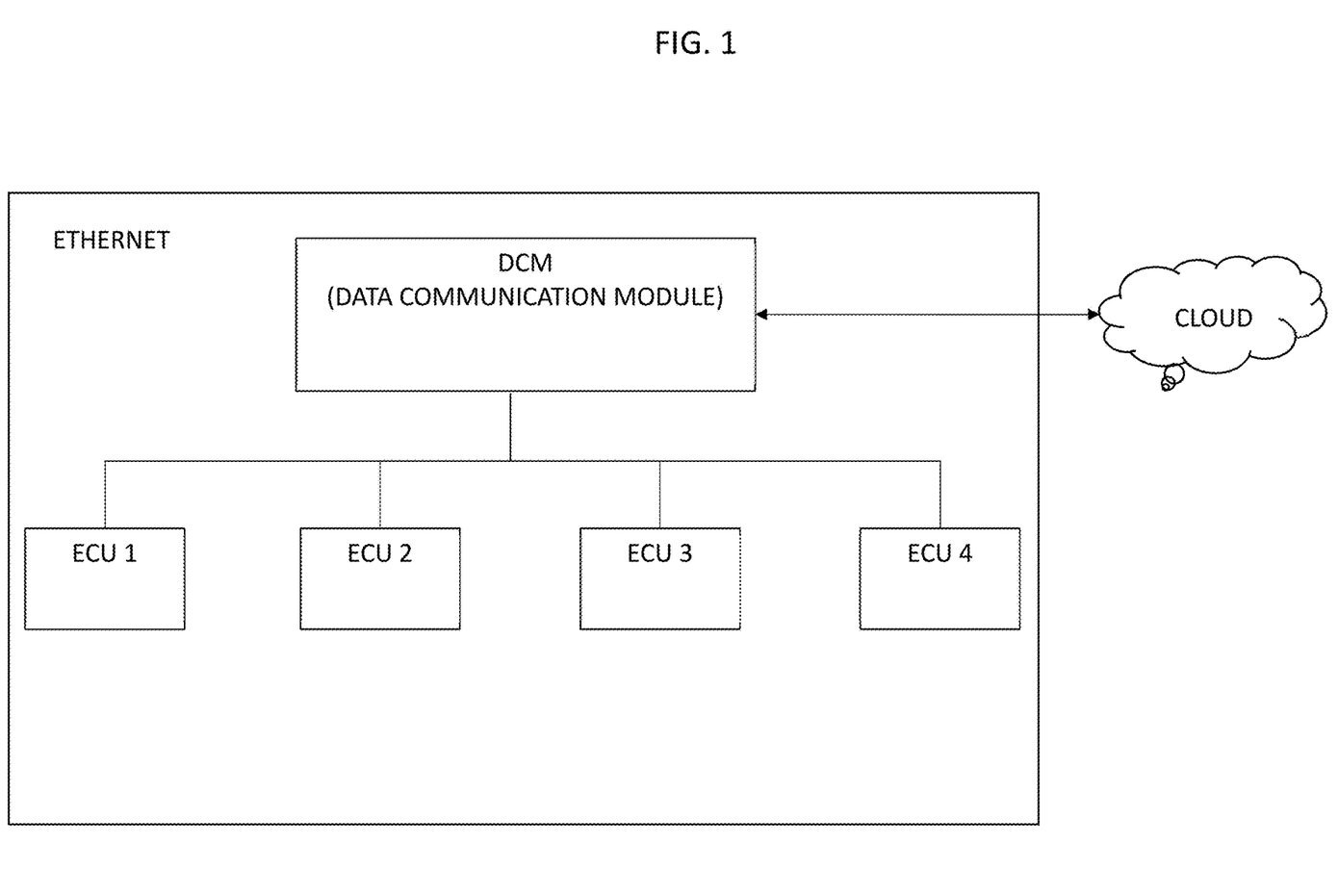
FIG. 1 illustrates the connectivity of multiple ECUs to an in-vehicle Ethernet network according to one embodiment.

FIG. 1 illustrates the connectivity of multiple ECUs to an in-vehicle Ethernet network according to one embodiment. Referring to the FIG. 1, a plurality of ECUs connected over a local area network (e.g., an Ethernet) through which the ECUs transmit and receive data. Further, the ECUs are connected to a data communication module (DCM) via the local area network in order to transmit and receive data over-the-air (e.g., via a cellular communication network).

For example, the DCM may manage the communication/data transfer between automotive protocols (e.g., an automotive Ethernet) and the communication/data transfer between the vehicle and the cloud (e.g., via a cellular communication network). The DCM may provide physical isolation between different ECU's (controlling various sensors and actuators) and protocol portability/translation to route signals between functional domains in a vehicle (e.g., for powertrain, chassis and safety, body control, infotainment, telematics, ADAS) that share data. To this end, the DCM may act as a router and enables communication between multi-protocol and connected services or may act as a hub that interconnects and transfers data across different networks (e.g., the Ethernet, cellular communication network, etc.).

Each of the ECUs is an embedded system in automotive electronics that controls one or more of the electrical systems or subsystems in the vehicle. For example, ECUs among other roles (functions) may have one of the following roles (functions): an engine control module (ECM), powertrain control module (PCM), transmission control module (TCM), brake control module (BCM or EBCM), body control module (BCM), suspension control module (SCM), etc. In addition, ECUs can be integrated into a functional ECU (e.g., an ECU that performs all ADAS functions). In an embodiment, a ECU may also take over roles of a DCM (e.g., as a master ECU), wherein said ECU may act as a central control module (CCM), central timing module (CTM), etc.

Figure 2:
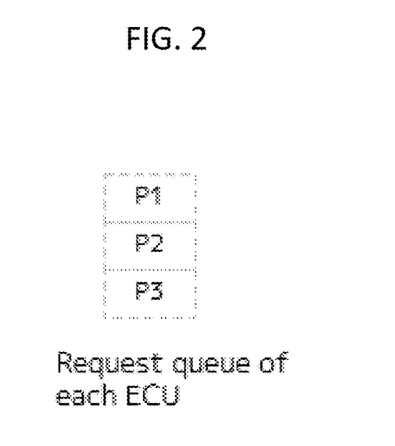
FIG. 2 illustrates a request queue of a ECU according to one embodiment.

FIG. 2 illustrates a data transfer I/O request queue of an ECU according to one embodiment. Referring to FIG. 2, each ECU defines or designate priorities for data transfer I/O requests. For example, each ECU may define or designate priorities for data transfer I/O requests by dividing and categorizing said requests into three priorities (i.e., priorities P1, P2, P3).

The priorities (e.g., P1, P2, P3) may refer to priority levels (e.g., low priority, medium priority, high priority, etc.). The number of priorities (i.e., the number of priority levels) is determined between all (or a plurality of) ECUs within the in-vehicle communication network (e.g., the number of priorities may be predetermined for all ECUs). Alternatively, the number of priorities (i.e., the number of priority levels) maybe dynamically adjusted by a DCM or a master ECU.

Moreover, each ECU may maintain a priority table that maps the priority levels to ECU specific communication priorities based on its role. For example, each ECU may maintain a priority table that maps priority levels to at least one of application IDs of applications to which data is being sent or received, types of data transfers (e.g., in-network vs. out of network), etc.

Furthermore, a master priority table may be maintained by a master ECU (i.e., an ECU that act as a CCM, etc.) and shared to all ECUs.

Conversely, each ECU or OS may configure and maintain its own priority table. Further, a plurality of priority tables may be created and stored, e.g., a first priority table for in-vehicle network traffic (e.g., via the automotive Ethernet) and a second priority table for external communication data (e.g., over-the-air transmissions).

In addition, a plurality of priority tables may be created and stored based on the timing (latency) constraints, system critical requirements, etc. depending on the particular role (i.e., function) of the ECUs. For example, the priority table of a brake control module (e.g., a BCM or EBCM) may differ from the priority table of a general electronic module (GEM) that controls electrical devices such as power windows.

Still referring to FIG. 2, the position in the request queue indicates when the data transfer I/O request is to be transferred via the vehicle network (e.g., the Ethernet). For example, the request P1 at the top of the request queue is to be sent over the vehicle network first, while request P2 is second and P3 is third in the queue (i.e., the sequence to be transferred). The transfer timing of the data transfer I/O requests to be transferred (i.e., the data transfer I/O requests on the top of the request queue) is scheduled by a plurality of phases in predefined time slices for data transmission as shown in FIG. 3.

Figure 3:
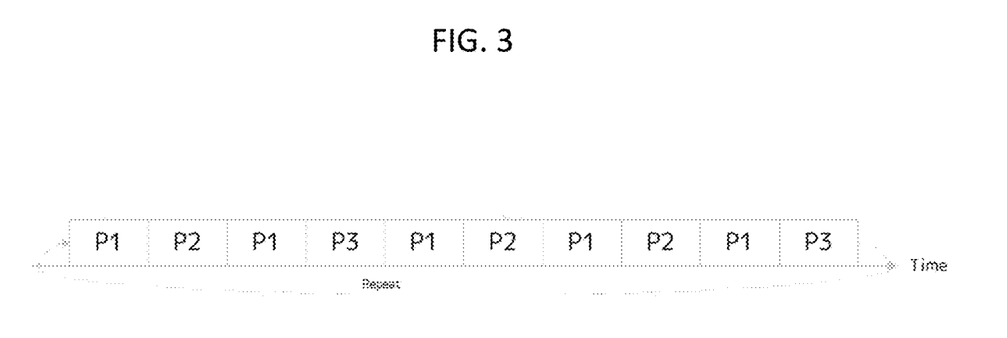
FIG. 3 illustrates scheduling of a plurality of phases in predefined time slices for data transmission according to one embodiment.

FIG. 3 illustrates scheduling of a plurality of phases in predefined time slices for data transmission according to one embodiment. Referring the FIG. 3, the DCM or the master ECU (e.g., a CTM) predetermines (i.e., creates) a plurality of time periods that divides a transmission time into a plurality of time slices. Each time slice of the plurality of time slices may be mapped to a phase. The phase is a certain time period (i.e., a time slice) that is reserved for the transmission of a request with a certain priority (e.g., a phase P1 is reserved to transmit requests with a priority P1). For example, according to a timeline according to the embodiment of FIG. 3, the DCM (or master ECU) may create a plurality of time slices and map them to a sequence of phases P1, P2, P1, P3, P1, P2, P1, P2, P1, P3 reserved for priorities P1, P2 and P3, respectively. According to the timeline, the sequence of phases over the transmission time includes 5 phases that are reserved for a priority P1 request, 3 phases that are reserved for a priority P2 request and two phases that are reserved for P3 request. In case priority P1 is mapped to a high priority request, P2 is mapped to medium priority request and P3 is mapped to low priority requests, the sequence as set forth in the above example provides ample time to periodically transmit (i.e., once after any of a P2 or P3 phase) high priority requests via the in-vehicle communication network, whereas medium priority requests (i.e., P2 priority requests) are considered to be have the second most time slices and low priority requests have the third most time slices within the transmission time as illustrated in FIG. 3. This allocation and the scheduling of phases according to priority has the advantage that high priority requests of ECUs are preferred over other (lower level) priority request which ensures that highest priority requests are transferred in a timely manner and optimizes the reliability of the data transmission within in-vehicle communication network.

Figure 4:
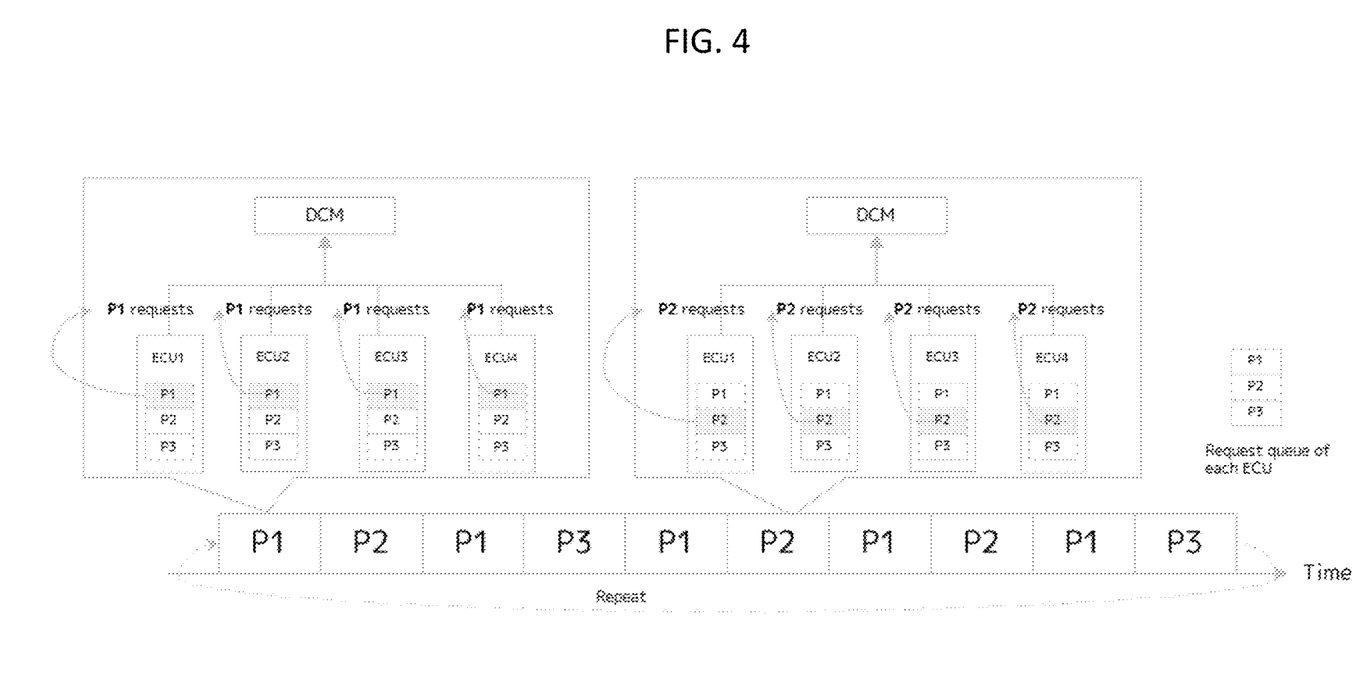
FIG. 4 illustrates an allocation of data transfer I/O requests in request queues of at least one ECU within the in-vehicle communication network to predefined time slices of phases for data transmission according to one embodiment.

FIG. 4 illustrates an allocation of a phase in request queues of at least one ECU within the in-vehicle communication network to predefined time slices for data transmission according to one embodiment.

Referring to FIG. 4, in a first example, on the right side of FIG. 4, illustrates a DCM and four ECUs (e.g., ECU1, ECU2, ECU3, ECU4) that all have the same priority level P1 of requests (i.e., input/output requests). Moreover, in a second example, on the left side of FIG. 4, a DCM and four ECUs (e.g., ECU1, ECU2, ECU3, ECU4) that all have the same priority level P2 of requests (i.e., input/output requests) is illustrated. Each ECUs in the right and left side of FIG. 4 is configured to transfer a request only when the current phase is the same as the priority of the request. Accordingly, in the first example, P1 requests are transferred on the network only during the corresponding P1 phase, and, in the second example, P2 requests are transferred only during the corresponding P2 phase.

Figure 5:
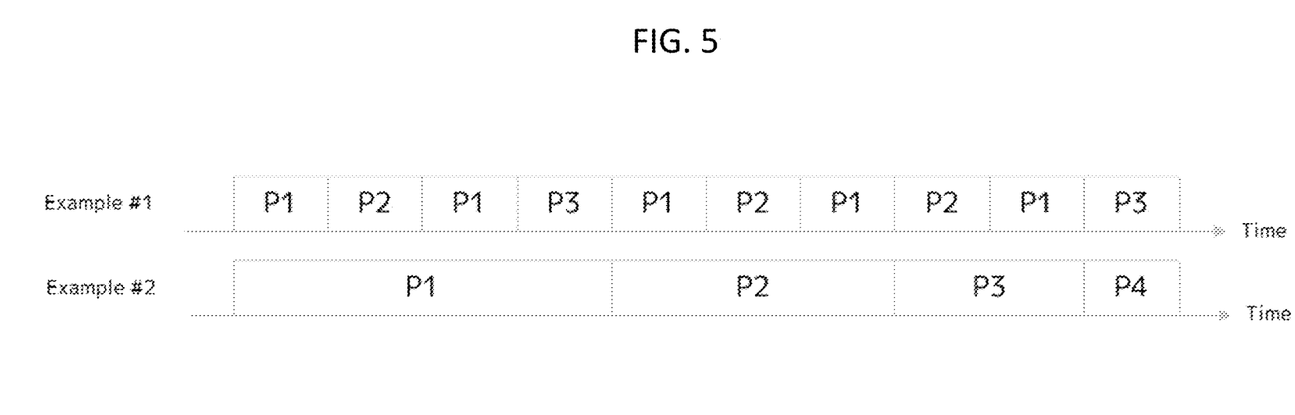
FIG. 5 illustrates a configurable scheduling of a plurality of phases in predefined time slices for data transmission according to one embodiment.

FIG. 5 illustrates a configurable scheduling of a plurality of phases in predefined time slices for data transmission according to one embodiment. Referring to the FIG. 5, the first timeline illustrates time slices in which each of the phases may have the same size (e.g., similar to the timeline in FIG. 3), and a second timeline that alternatively illustrates time slices in which each of the phases may have different sizes (i.e., the size of phases and phase scheduling are configurable. According to the embodiment in FIG. 5, the phases, depending on the priority they reserve, may be configured to have different time periods (i.e., the time slices of the phases may be different from each other). As a result, a first phase reserved for data transfer I/O requests with a first priority may be longer than then a second phase reserved for data transfer I/O requests with a second priority (e.g., a phase P1 reserved for P1 requests may be longer than a phase P2 reserved for P2, etc.). The priority level may not be related with the length of the phase (e.g., a P1 phase may be shorter than a P2 phase, etc.)

Still referring to FIG. 5, the DCM (or master ECU) creates phases of different size for four different priorities (i.e., priority levels) P1, P2, P3, P4. According to this example, the sequence of phases P1, P2, P3, P4 over a transmission time may include a first phase P1 reserved for P1 requests that has the longest time slice, a second phase P2 reserved for P2 requests that has the second longest time slice, a third phase P3 reserved for P3 requests for the third longest time slice, and a fourth phase P4 reserved for P4 requests that has forth longest time slice.

Based on a configuration of the phases into different sizes, the number of data I/O transfer requests of the same priority that can be transferred in the respective phase (i.e., in the phase reserved to the respective priority of the request) is also configurable. In an example embodiment, the DCM and/or the master ECU may be configured to adapt the size of phase (i.e., the duration of the time slice of the phase) so that all requests of the same priority from different ECUs (i.e., requests are schedules to be transferred in accordance to their position in request queues of different ECUs) can be transferred at the scheduled time of their respective phase (i.e., accommodated by the adapted phase).

To this end, in an example embodiment, the DCM and/or the master ECU may be configured to determine the size of the phase (i.e., how much time should be allocated for the time slice of the phase). For example, the DCM and or the master ECU may be configured to determine the size of a P1 phase for a first priority to accommodate all P1 request based on an evaluation of the request queues of each ECU within the network. For example, if there are 5 different ECUs each having a P1 request on the $3^{rd}$ position of the request queues, the DCM or the master ECU may create a P1 phase that can accommodate said 5 P1 requests at the time said 5 P1 requests reach the top position in the request queues (i.e., all 5 P1 requests are scheduled to be transferred).

The configurable phase size has the advantage that all data transfer I/O requests with the same priority on the same position in the request queues of each ECU can be considered in order to ensure that requests with the same priority are transferred. This ensured transfer of data optimizes the reliability of the data transmission within in-vehicle communication network.

Moreover, depending on the function (role) of respective ECUs, the ECUs may require a longer transmission time for certain data transfer I/O requests. As a result, the DCM or master ECU can configure the phase sizes in accordance with the requirements of the ECUs (i.e., according to the applications mapped to the respective priorities in the priority table of each ECU) to ensure that highest priority requests are transferred in a timely manner and to optimize the reliability of the data transmission within in-vehicle communication network.

There could be various scheduling strategies depending on the target vehicle's environment. For example, regarding the various roles (functions) of ECUs and the various configurations of the in-vehicle communication network, a combination of one of a number of different phases (i.e., the phases P1, P2, P3, . . . , Pn, etc.), a frequency of repetitions of phases in one sequence (i.e., as shown in FIG. 3) and configurable sizes of phases (e.g., as shown in FIG. 5) may be applied to manage the bandwidth of the in-vehicle communication network.

Moreover, as set forth above, in various embodiments, the sizes and/or scheduling of the phases may be static or configurable. Where configurable, one designated ECU (e.g., the master ECU or DCM) may be responsible for configuring the sizes and/or scheduling of phases. For example, the variable configuration may be done adaptively by an operating system or scheduler of the designated ECU (e.g., based on feedback data, current monitored network parameters/performance/KPIs, a machine learning model, etc.) or via an over-the-air update to the operating system/scheduler.

Figure 6:
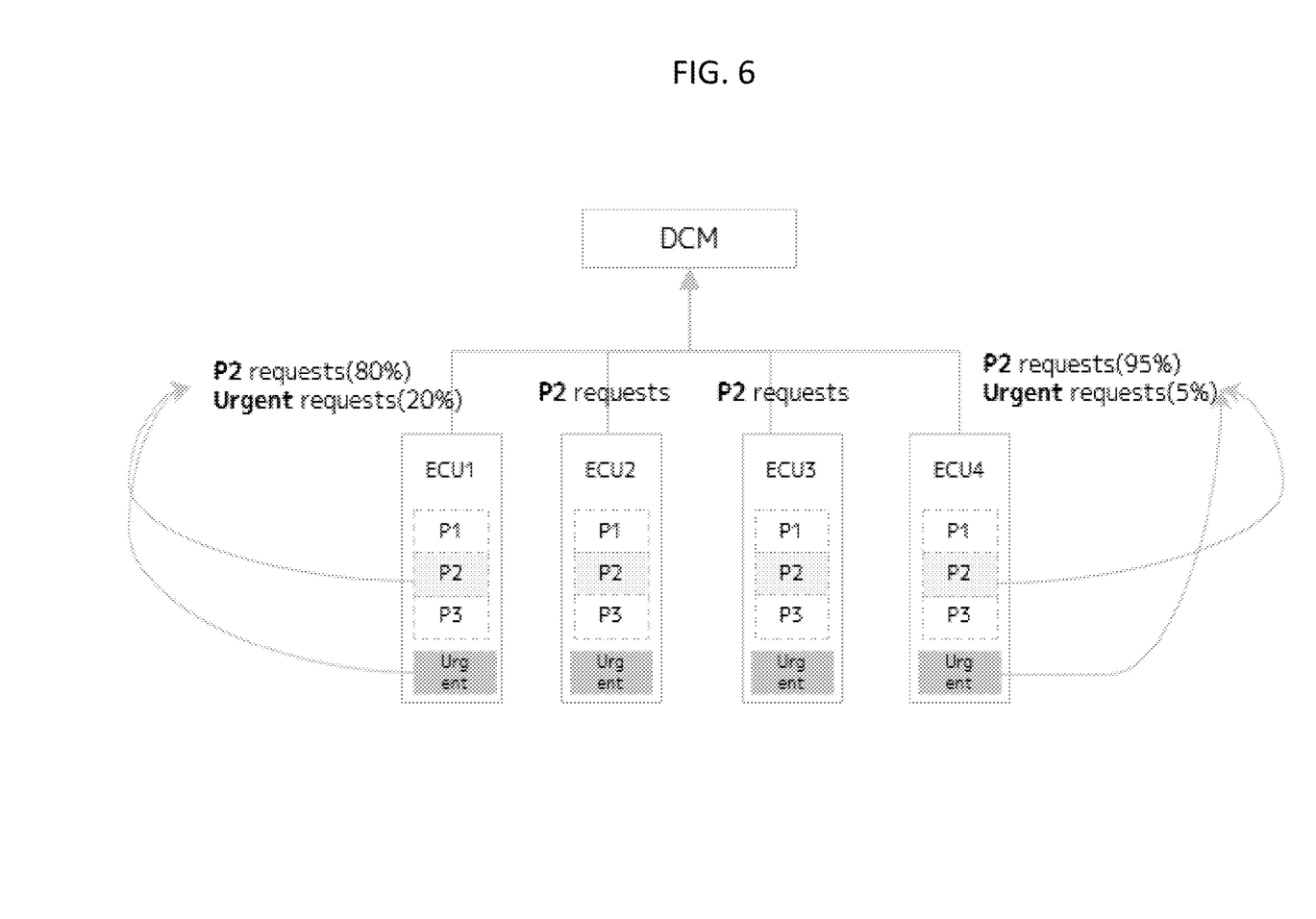
FIG. 6 illustrates an allocation of a predetermined maximum percentage to each phase for prioritizing urgent requests according to an embodiment.

FIG. 6 illustrates an allocation of a predetermined maximum percentage to each phase for prioritizing urgent requests according to an embodiment. Referring to FIG. 6, in one or more embodiments, a predetermined allocation (e.g., 20%) of each phase (e.g., percentage of network bandwidth, total number of requests, time, etc.) may be afforded to urgent requests. The predetermined allocation may be the same for each phase, or may vary between phases (e.g., the allocation for urgent requests may be lower for higher priority phases, e.g., phase P1, and higher for lower priority phases, e.g., phase P3). Thus, urgent requests can be transferred up to the predetermined allocation (X %) of each phase regardless of the priority of the phase.

For example, depending on the role (function) of the ECU and the constraints regarding its relations with other ECUs, a low priority request of a first ECU may have a more serious impact to vehicle safety than a high priority request of second ECU. In this case, urgent requests outside the allocation of priorities to data transfer I/O requests may have to be accommodated at a scheduled transfer timing. This type of urgent request can be transferred up to the predetermined allocation (X %) of each phase regardless of the priority of the phase.

Figure 7:
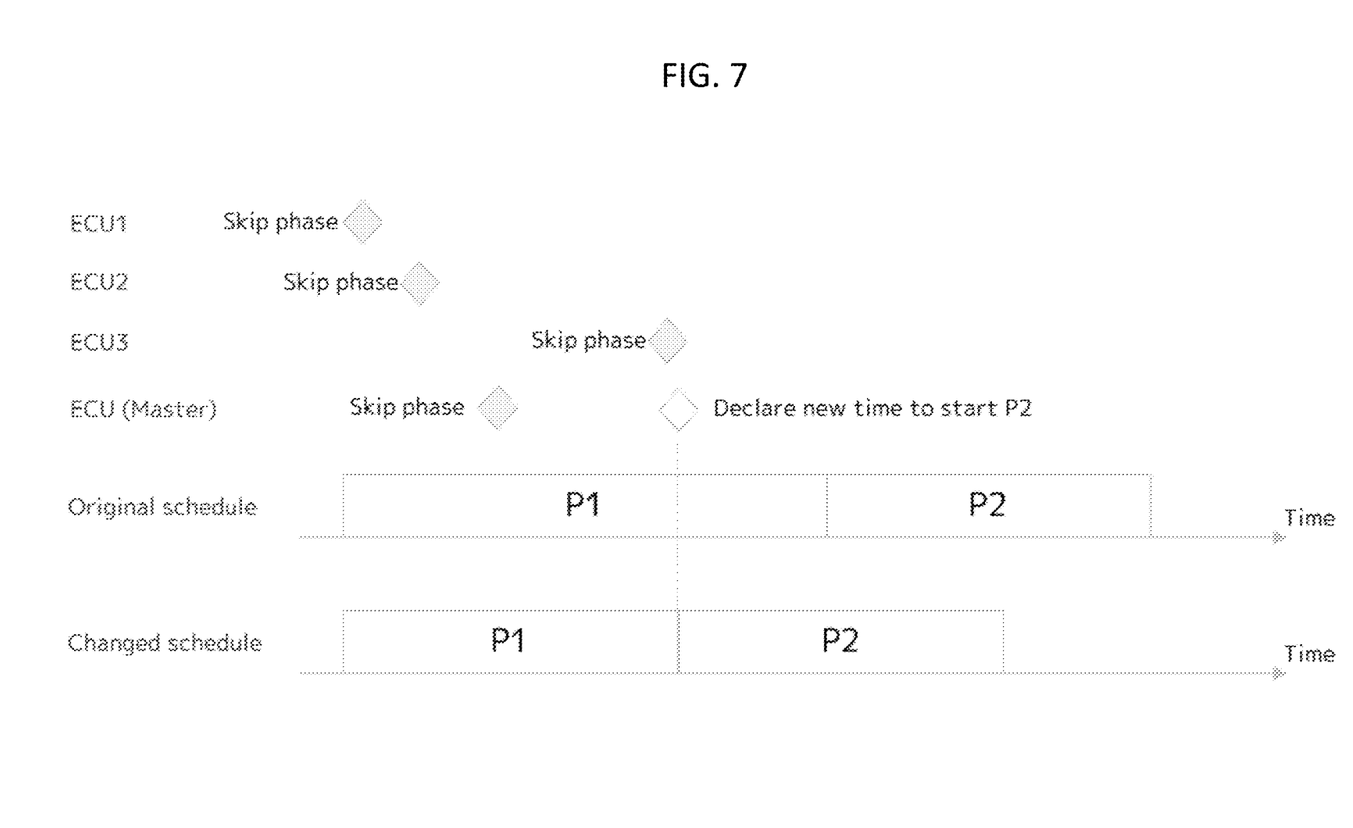
FIG. 7 illustrates controlling a transition to a next phase ahead of a scheduling time for the next phase in a predefined time slice for data transmission according to one embodiment.

FIG. 7 illustrates controlling a transition to a next phase ahead of a scheduling time for the next phase in a predefined time slice for data transmission according to one embodiment.

Referring to FIG. 7, in order to more efficiently utilize the network bandwidth, a particular phase may be ended (transitioned to a next scheduled phase) prior to its scheduled transition time if there are no more requests corresponding to that phase from any ECU. For example, when an ECU's queue for a priority corresponding to a current phase is empty, the ECU may signal this status to a master ECU (e.g., declare "skip phase"). If all ECUs signal an empty queue for the current phase (e.g., all ECUs declare "skip phase"), the master ECU may force a transition to start the next phase. For example, the master ECU may declare a new time to start a next phase ahead of schedule.

For FIGS. 1 to 7, in order to avoid time discrepancies between the ECUs, all the ECUs may be time synchronized regularly (e.g., periodically according to a predetermined schedule or based on a triggering event such as a network failure or system error). A designated ECU (e.g., master ECU such as a central control module (CCM), central timing module (CTM), etc.) may be configured to control or perform the time synchronization with each ECU, e.g., by declaring a time to start a scheduled phase. System clocks for each ECU may also be synchronized by the master ECU or in a sequential or daisy-chain manner.

According to the example embodiments the method and system realizes an allocation of different priorities to different data transfer I/O requests in request queues of each ECU and scheduling the data transfer I/O requests over the network based on the allocated priorities that ensures that highest priority requests are transferred in a timely manner. Moreover, the allocating and scheduling as set forth above ensures that lower priority data transfer I/O requests are considered, respectively. As a result, the transfer of data from each ECU can be guaranteed and bandwidth management can be optimized to lower the latency of high priority requests. This improvement in bandwidth management makes ADAS and AD systems more efficient and increases driving safety and comfort.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A system for scheduling data transfer requests for a plurality of electronic control units (ECUs) connected to a network in a vehicle, the system comprising:
   at least one memory storing first instructions and second instructions;
   a first ECU; and a plurality of second ECUs,
wherein the first ECU is configured to execute the first instructions to, prior to transferring data over the network, define a plurality of time slices, and to map each of the plurality of time slices to one of a plurality of phases, wherein each of the plurality of phases is reserved for transferring the data having a corresponding priority level over the network at a corresponding time slice from the plurality of time slices, and
wherein each of the plurality of second ECUs is configured to execute the second instructions to:
  maintain a data transfer request queue divided into a plurality of priority levels respectively corresponding to the plurality of phases;
  transfer a data transfer request in the queue during one of the plurality of phases that is reserved for transferring data having a priority level corresponding to a priority level for the data transfer request;
  indicate, to the first ECU, that a request queue for a priority level corresponding to a current phase is empty; and
  control to transition, by the first ECU, to a next phase ahead of a scheduling time for the next phase, based on all of the plurality of second ECUs indicating that their respective request queue is empty for the priority level corresponding to the current phase.

2. The system according to claim 1, wherein each of the plurality of phases has a same size.

3. The system according to claim 1, wherein at least two of the plurality of phases have different sizes.

4. The system according to claim 3, wherein a size of a phase corresponding to a higher priority level is greater than a size of a phase corresponding to a lower priority level.

5. The system according to claim 1, wherein the first ECU is further configured to execute the first instructions to:
  change a prior configuration of the plurality of phases.

6. The system according to claim 5, wherein the first ECU is further configured to execute the first instructions to:
  change the prior configuration to a new configuration based on at least one of network performance data and a current network environment.

7. The system according to claim 1, wherein the first ECU is further configured to execute the instructions to:
  allocate a predetermined maximum percentage to each phase for prioritizing urgent requests.

8. A method for scheduling data transfer requests for a plurality of electronic control units (ECUs) connected to a in a vehicle, the method comprising:
  prior to transferring data over the network:
    (i) defining, by at least one ECU of the plurality of ECUs, a plurality of time slices; and
    (ii) mapping, by the at least one ECU of the plurality of ECUs, each of the plurality of time slices to one of a plurality of phases, wherein each of the plurality of phases is reserved for transferring the data having a corresponding priority level over the network at a corresponding time slice from the plurality of time slices;
  maintaining, by each of the plurality of ECUs, a data transfer request queue divided into a plurality of priority levels respectively corresponding to the plurality of phases;
  transferring, by each of the plurality of ECUs, a data transfer request in the queue during one of the plurality of phases that is reserved for transferring data having a priority level corresponding to a priority level for the data transfer request;
  indicating, by an ECU of the plurality of ECUs to the at least one ECU, that a request queue, of the ECU, for a priority level corresponding to a current phase is empty; and
  controlling to transition, by the at least one ECU, to a next phase ahead of a scheduling time for the next phase, based on all of the plurality of ECUs indicating that their respective request queue is empty for the priority level corresponding to the current phase.

9. The method according to claim 8, wherein each of the plurality of phases has a same size.

10. The method according to claim 8, wherein at least two of the plurality of phases have different sizes.

11. The method according to claim 10 wherein a size of a phase corresponding to a higher priority level is greater than a size of a phase corresponding to a lower priority level.

12. The method according to claim 8, wherein the configuring comprises changing, by the at last one ECU, a prior configuration of the plurality of phases.

13. The method according to claim 12, wherein the changing the prior configuration comprises changing the prior configuration to a new configuration based on at least one of network performance data and a current network environment.

14. The method according to claim 8, wherein the configuring comprises allocating a predetermined maximum percentage to each phase for prioritizing urgent requests.

15. At least one non-transitory computer-readable recording medium having recorded thereon instructions executable by a plurality of electronic control units (ECUs) connected to a network in a vehicle, to perform a method for scheduling data transfer requests for the plurality of ECUs, the method comprising:
  prior to transferring data over the network
    (i) defining, by at least one ECU of the plurality of ECUs, a plurality of time slices; and
    (ii) mapping, by the at least one ECU of the plurality of ECUs, each of the plurality of time slices to one of a plurality of phases, wherein each of the plurality of phases is reserved for transferring the data having a corresponding priority level over the network at a corresponding time slice from the plurality of time slices;
  maintaining, by each of the plurality of ECUs, a data transfer request queue divided into a plurality of priority levels respectively corresponding to the plurality of phases;
  transferring, by each of the plurality of ECUs, a data transfer request in the queue during one of the plurality of phases that is reserved for transferring data having a priority level corresponding to a priority level for the data transfer request;
  indicating, by an ECU of the plurality of ECUs to the at least one ECU, that a request queue, of the ECU, for a priority level corresponding to a current phase is empty; and
  controlling to transition, by the at least one ECU, to a next phase ahead of a scheduling time for the next phase, based on all of the plurality of ECUs indicating that their respective request queue is empty for the priority level corresponding to the current phase.

16. The at least one non-transitory computer-readable recording medium according to claim 15, wherein each of the plurality of phases has a same size.

17. The at least one non-transitory computer-readable recording medium according to claim 15, wherein at least two of the plurality of phases have different sizes.

18. The at least one non-transitory computer-readable recording medium according to claim 17 wherein a size of a phase corresponding to a higher priority level is greater than a size of a phase corresponding to a lower priority level.

* * * * *